US008986144B2

(12) United States Patent
Takemoto et al.

(10) Patent No.: US 8,986,144 B2
(45) Date of Patent: Mar. 24, 2015

(54) POWER TRANSMISSION DEVICE

(75) Inventors: Norihiro Takemoto, Sagamihara (JP); Yasuo Takagi, Komae (JP); Terumasa Hidaka, Chigasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 292 days.

(21) Appl. No.: 13/111,175

(22) Filed: May 19, 2011

(65) Prior Publication Data

US 2011/0287882 A1 Nov. 24, 2011

(30) Foreign Application Priority Data

May 20, 2010 (JP) .................................. 2010-116258

(51) Int. Cl.
- *B25G 3/28* (2006.01)
- *F16H 55/30* (2006.01)
- *F16H 57/021* (2012.01)
- *F16H 61/00* (2006.01)
- *F16H 57/04* (2010.01)

(52) U.S. Cl.
CPC .......... *F16H 57/021* (2013.01); *F16H 61/0025* (2013.01); *F16H 57/0441* (2013.01)
USPC ...................... 474/152; 403/359.1; 403/359.2; 403/359.3; 403/359.4; 403/359.5; 403/359.6

(58) Field of Classification Search
CPC . F16H 55/30; F16H 55/171; F16H 2055/306; F16H 7/023; B62M 9/10
USPC .............................. 474/152; 403/359.1–359.6
See application file for complete search history.

(56) References Cited

U.S. PATENT DOCUMENTS

| 6,379,278 | B1 * | 4/2002 | Eguchi et al. .................... 477/34 |
| 6,855,084 | B2 * | 2/2005 | Sato et al. ....................... 475/209 |
| 6,988,831 | B2 * | 1/2006 | Nakamura et al. ............. 384/513 |
| 7,412,913 | B2 * | 8/2008 | Ishikawa et al. .............. 74/732.1 |
| 2002/0006237 | A1 * | 1/2002 | Nakamura et al. ............. 384/490 |
| 2007/0082774 | A1 * | 4/2007 | Tawarada ........................ 474/111 |
| 2008/0293530 | A1 * | 11/2008 | Makita ............................ 474/152 |
| 2009/0098969 | A1 | 4/2009 | Tabata et al. |

FOREIGN PATENT DOCUMENTS

| CN | 101247969 A | 8/2008 |
| EP | 1 069 346 A2 | 1/2001 |
| JP | 2001-027316 A | 1/2001 |

(Continued)

OTHER PUBLICATIONS

Japanese Office Action and English Language Translation, dated Oct. 15, 2013, (6 pgs.).

*Primary Examiner* — Henry Liu
(74) *Attorney, Agent, or Firm* — Foley & Lardner LLP

(57) ABSTRACT

A power transmission device is used to distribute torque from a power source to an external device and an auxiliary device. The power transmission device is comprised of a first bearing and a second bearing both secured to a stationary member, a first sprocket rotatably supported by the first bearing, a second sprocket capable of being drivingly coupled with the auxiliary device, a chain coupling the first sprocket with the second sprocket, a rotary shaft rotatably supported by the second bearing, which is drivingly coupled with the power source and drivingly engageable with the external device to transmit a first part of the torque to the external device, and a joint drivingly linking the rotary shaft with the first sprocket to transmit a second part of the torque to the first sprocket.

12 Claims, 8 Drawing Sheets

(56) References Cited

FOREIGN PATENT DOCUMENTS

| JP | 2002-295630 A | 10/2002 |
| JP | 2004-286144 A | 10/2004 |
| JP | 2006-90367 A | 4/2006 |
| JP | 2011-106521 A | 6/2011 |

* cited by examiner

POWER TRANSMISSION DEVICE

BACKGROUND OF THE INVENTION

1. Field of the Invention

The present invention relates to a power transmission device which is capable of distributing torque in part to an external device such as a gearbox and in part to an auxiliary device such as an oil pump.

2. Description of the Related Art

In an automobile, torque generated by an engine or an electric motor is transmitted to wheels via a power transmission. In certain cases, the automobile is equipped with an auxiliary device such as an oil pump and then sometimes uses a chain drive to distribute the torque in part to the auxiliary device to power the auxiliary device. Japanese Patent Unexamined Application Laid-open No. 2001-27316 discloses a related art.

SUMMARY OF THE INVENTION

In the aforementioned related art, a rotary shaft for transmitting the torque to the gearbox directly supports a sprocket coupled with the chain. Tension of the chain can transmit the distributed torque, but the tension simultaneously imparts a radial load on the rotary shaft via the sprocket. The inventors have found out that the radial load will cause misalignment of the rotary shaft and therefore shorten the lifetime of the device.

The present invention has been achieved in view of the aforementioned problem. According to an aspect of the present invention, a power transmission device for distributing torque from a power source to an external device and an auxiliary device is comprised of a first bearing and a second bearing both secured to a stationary member; a first sprocket rotatably supported by the first bearing; a second sprocket capable of being drivingly coupled with the auxiliary device; a chain coupling the first sprocket with the second sprocket; a rotary shaft rotatably supported by the second bearing, the rotary shaft being drivingly coupled with the power source and drivingly engageable with the external device to transmit a first part of the torque to the external device; and a joint drivingly linking the rotary shaft with the first sprocket to transmit a second part of the torque to the first sprocket.

DETAILED DESCRIPTION OF THE EXEMPLARY EMBODIMENTS

Exemplary embodiments of the present invention will be described hereinafter with reference to the appended drawings.

Referring to FIGS. 1-6, a power transmission device according to a first embodiment of the present invention will be described hereinafter. The power transmission device is preferably loaded in a vehicle in combination with a power source such as a motor/generator 9 and an engine, to which a reference sign "Eng" is attached in FIG. 1. In the vehicle, the power transmission device is used for distributing torque from the power source to an external device such as a gearbox T/M and an auxiliary device such as an oil pump O/P.

Figure 1:
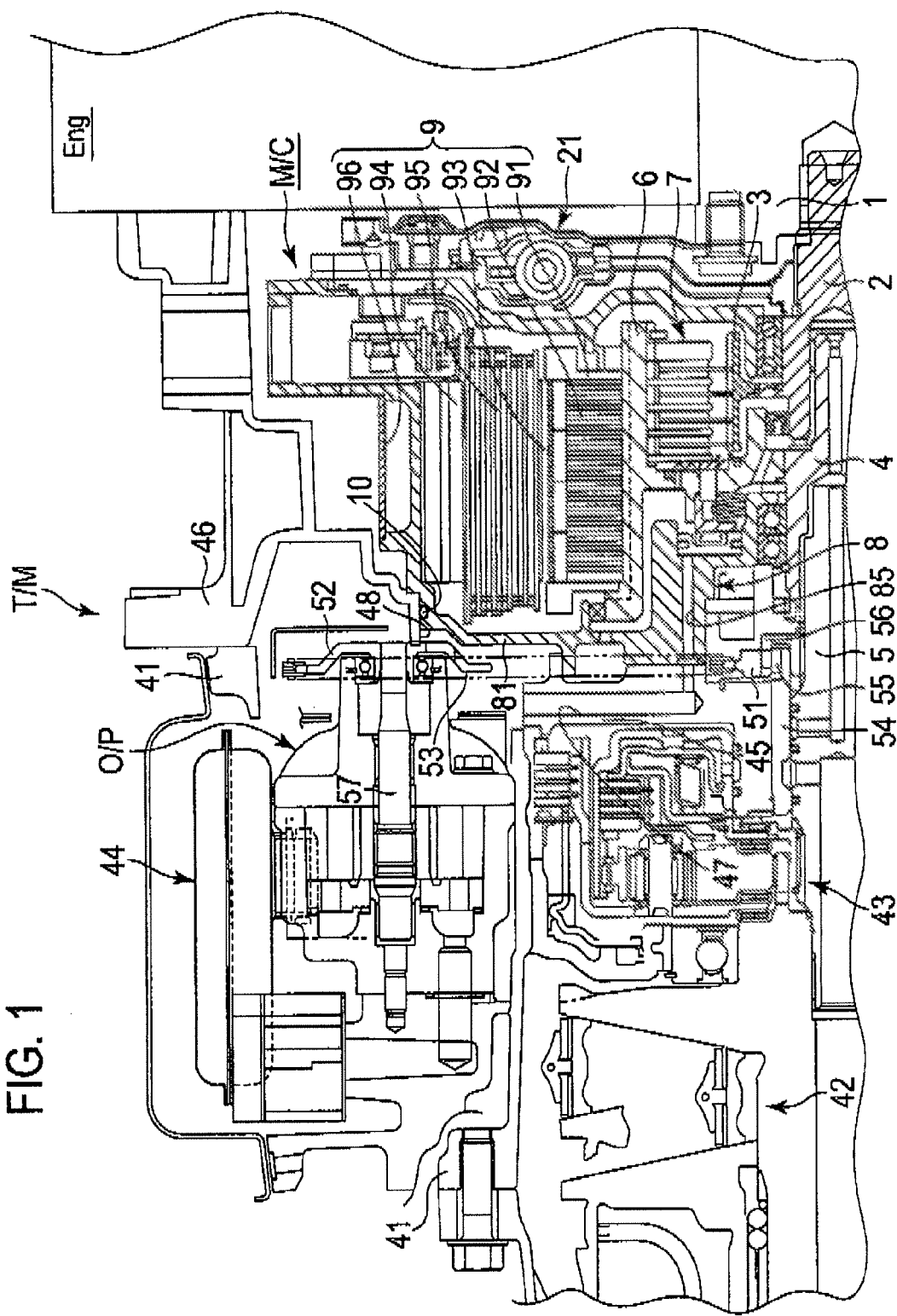
FIG. 1 is a cross sectional view of a power transmission device with an oil pump and a gearbox according to a first embodiment of the present invention.

Mainly referring to FIG. 1, the power transmission device is comprised of a clutch hub 3 with a clutch hub shaft 2 drivingly coupled with an output shaft 1 of the engine Eng, a clutch cover shaft 4 drivingly coupled with a clutch cover 6, the motor/clutch unit M/C intervened between the clutch hub 3 and the clutch cover 6, and a rotary shaft 5 coupled with the clutch cover shaft 4 for output of the torque. Between the clutch hub shaft 2 and the clutch cover shaft 4 interposed is a needle bearing so as to allow relative rotation and prevent axial motion.

Throughout the description and claims, an axial direction is defined to correspond with a direction of a common axis of the shafts 2, 4 and 5, and radial directions are defined to be directions perpendicular to the axial direction.

A casing 46 carries the motor/clutch unit M/C and a housing 41 carries the gearbox T/M. The casing 46 and the housing 41 are both stationary members and mutually connected. A cylinder housing 81 is housed in and secured to the casing 46. Thus the cylinder housing 81 is a stationary member too.

The cylinder housing 81 has one or more bearings for rotatably supporting the clutch hub shaft 2, which receives torque from the engine Eng. The clutch hub shaft 2 has a hollow for coaxially rotatably supporting one end of the clutch cover shaft 4, which is also rotatably supported by the cylinder housing 81 and in turn supports one end of the rotary shaft 5. The other end of the rotary shaft 5 is supported by a pulley shaft rotatably supported by the housing 41.

The motor/clutch unit M/C is coupled with the clutch hub shaft 2 and thus on the one hand controllably transmits the torque from the engine Eng to the clutch cover 6. The motor/clutch unit M/C has a motor/generator 9 and thus on the other hand outputs torque by itself. The motor/clutch unit M/C is comprised of a multi-plate clutch 7, a slave cylinder 8, and the motor/generator 9 drivingly coupled with the clutch cover 6.

The multi-plate clutch 7 has a plurality of inner plates (driving plates) 71 drivingly coupled with the clutch hub 3 and a plurality of outer plates (driven plates) 72 drivingly coupled with the clutch cover 6. Although the driving plates 71 and the driven plates 72 are normally disengaged (opened), these plates 71, 72 can be mutually engaged when pressure is applied.

The multi-plate clutch 7, when engaged (closed), transmits torque from the engine Eng via the clutch hub 3 to the clutch cover 6, and, when disengaged (opened), intermits transmission of the torque. More specifically, the vehicle is normally in an electric vehicle mode as the multi-plate clutch 7 is normally disengaged (opened) and thus only the motor/generator 9 powers the vehicle. However, the vehicle comes into a hybrid mode when the multi-plate clutch 7 is engaged (closed) as the engine Eng also powers the vehicle via the multi-plate clutch 7.

The clutch cover shaft 4 is rotatably supported by the cylinder housing 81 and has one or more ball bearings 12 therebetween. The clutch cover shaft 4 axially extends and has a splined hollow therein. The rotary shaft 5 has counterpart splines on its outer periphery. By meshing these splines, the rotary shaft 5 is drivingly coupled with the clutch cover shaft 4. The rotary shaft 5 at its opposite end further has splines, thereby being drivingly engageable with the gearbox T/M. Thus torque transmitted to the rotary shaft 5 is outputted to the gearbox T/M.

A concentric slave cylinder (referred to as CSC) can be applied to the slave cylinder 8, which hydraulically operates the multi-plate clutch 7. The slave cylinder 8 is comprised of a cylinder housing 81 in which the motor/clutch unit M/C is housed. As penetrating a wall of the cylinder housing 81, a first oil path 85 is provided for supplying pressurized oil to the slave cylinder 8. An O-ring 10 is provided for sealing oil.

The cylinder housing 81 is further comprised of an open cavity 80 in fluid communication with the oil path 85. The slave cylinder 8 is comprised of a piston 82 slidably supported in the cavity 80. Preferably an O-ring is provided around the piston 82 for preventing hydraulic loss. A gap 86 is held in the cavity 80 between the oil path 85 and the piston 82. Thus pressurized oil supplied through the oil path 85 flows into the gap 86 and exerts hydraulic pressure on the piston 82. More specifically, hydraulic power is therein converted into linear mechanical work of the piston 82.

The piston 82 has a needle bearing 87 interposed between the piston 82 and a piston arm 83, thereby transmitting linear motion to the piston arm 83 although allowing rotation of the piston arm 83. The piston arm 83 penetrates the clutch cover 6 via through holes 61 thereof and is in contact with a pressure plate 84. The pressure plate 84 with support by an elastic plate 89 is in contact with the multi-plate clutch 7. Thus the slave cylinder 8 powered by the pressurized oil exerts force on the multi-plate clutch 7 so as to let the multi-plate clutch 7 into the closed state. A return spring 84 is further provided for the purpose of recovering the open state of the multi-plate clutch 7 when the hydraulic pressure has gone.

The pressure plate 84 and the elastic plate 89 are so formed as to seal the oil within the side of oil path 85. Thus the side of the multi-plate clutch 7 is kept dried (oil-free).

Figure 3:
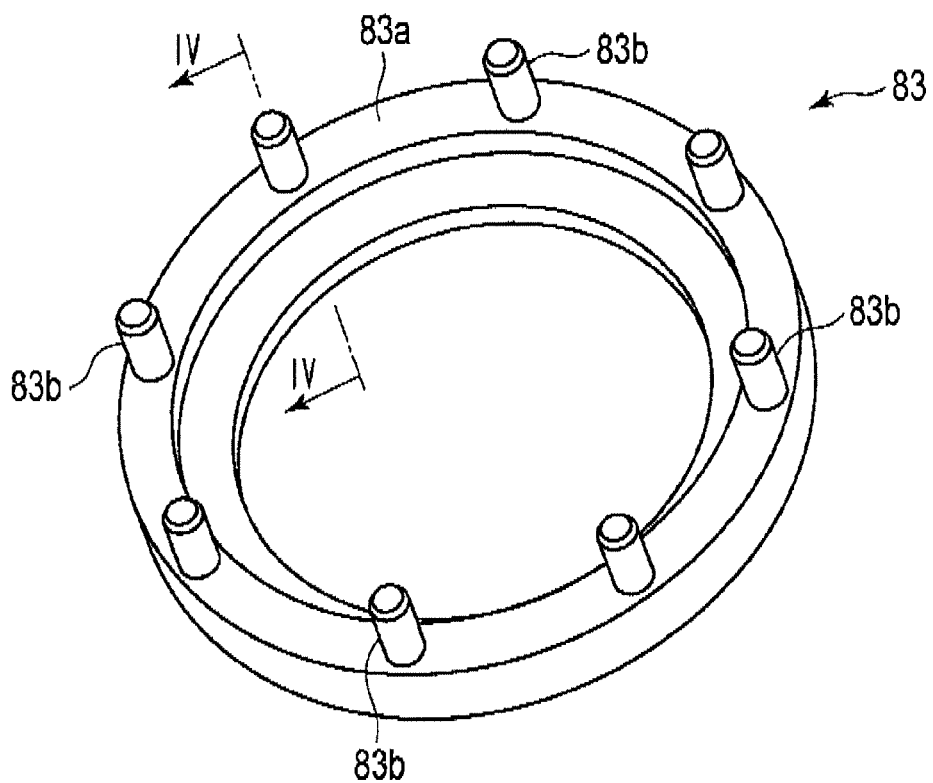
FIG. 3 is a perspective view of a piston arm of multi-plate clutch.
Figure 4:
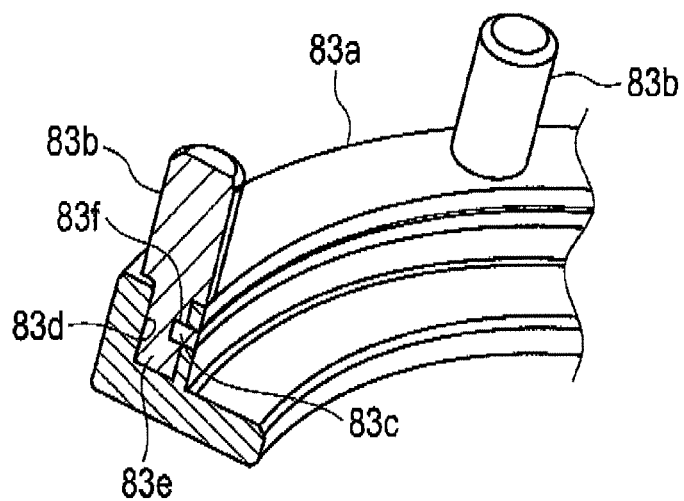
FIG. 4 is a partial perspective view of the piston arm showing a cross section thereof, which is taken from a line IV-IV of FIG. 3.

Referring to FIG. 3, the piston 83 is comprised of a ring-like body 83a and a plurality of projecting arm pins 83b. The arm pins 83b are so dimensioned as to respectively get into the through holes 61 of the clutch cover 6. Referring to FIG. 4, preferably a snap ring 83c snapped in the body 83a secures the arm pins 83b. Alternatively any other securing means may be applied thereto or the body 83a and the arm pins 83b may be formed in a unitary body.

Referring again to FIG. 1, to the motor/generator 9 preferably applied is a synchronous alternating-current motor. The motor/generator 9 is comprised of a frame 91 formed in a unitary body with the clutch cover 6, a rotor with permanent magnets drivingly supported by the frame 91, stators 94 secured to the cylinder housing 81, and electromagnet coils 95 respectively coiled around the stators 94. An air gap 93 is held between the rotor 92 and each stator 94. Further the cylinder housing 81 is comprised of a water jacket 96 for circulating cooling water and thus cooling the motor/generator 9.

The gearbox T/M coupled with the motor/clutch unit M/C is comprised of the housing 41 as a stationary member, a continuously variable transmission 42 housed in the housing 41, and the oil pump O/P as the auxiliary device with an oil filter 44. The continuously variable transmission 42 includes a pair of pulleys and a V-belt coupling the pulleys. The continuously variable transmission 42 continuously varies contact radii of the V-belt relative to the pulleys, thereby transmitting torque with varying its speed.

Figure 2:
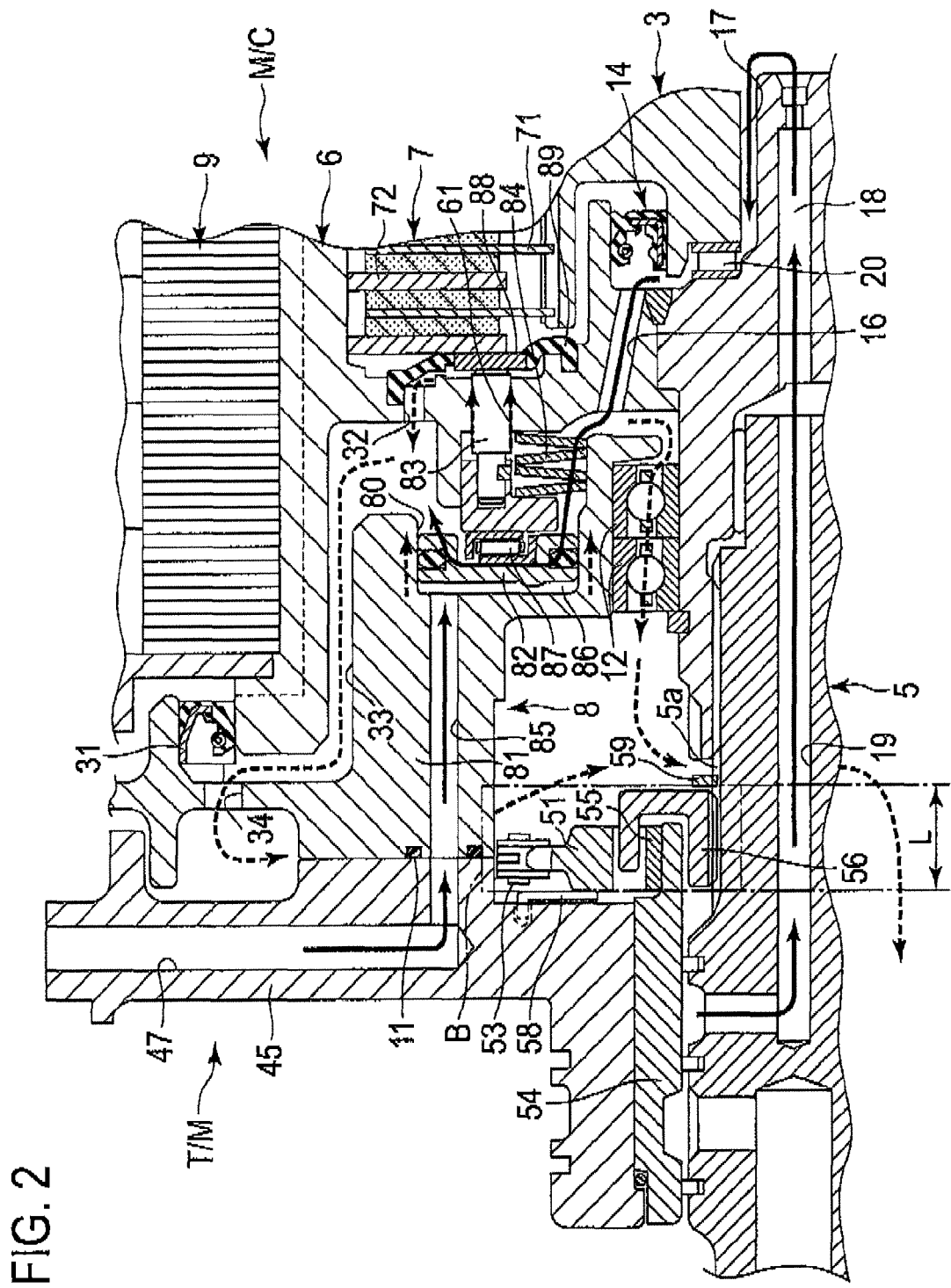
FIG. 2 is an enlarged cross sectional view of the power transmission device, particularly showing a multiplate clutch, a rotary shaft and a driving sprocket.

The oil pump O/P supplies pressurized oil as a source for hydraulic operation to the motor/clutch unit M/C and the gearbox T/M. Referring to FIG. 2, the housing 41 has an end plate 45 extending toward the oil pump O/P and an oil path 47 running therein. The oil path 47 is so dimensioned as to communicate with the oil path 85 of the cylinder housing 81 when the motor/clutch unit M/C is connected with the gearbox T/M. Then the oil paths 47, 85 constitute a global oil path for transmitting the pressurized oil to the piston 82. Preferably a sealing ring 11 is provided around the connection part between the oil paths 47 and 85.

The housing 41 further has an oil path 32 for recovery of oil leaking out of the through holes 61. The cylinder housing 81 and the clutch cover 6 hold a gap therebetween, which communicates with the open cavity 80 and thus functions as an oil path 33. The cylinder housing 81 further has an oil path 34 linking the oil path 33 with its exterior. The oil paths 32, 33 and 34 along with gaps in the ball bearings 12 constitute a global oil recovery path for recovery of oil after exerting hydraulic force to the oil pump O/P. The oil in the course of recovery is also used for lubrication of related members including the ball bearings 12. To avoid oil intrusion into the motor/generator 9, a sealing member 31 is repulsively fitted into a gap between the motor/generator 9 and the cylinder housing 81.

There may be another oil pathway for the purpose of lubrication. The rotary shaft 5 has a through hole along its axis, which functions as a first axial oil path 19. The clutch cover shaft 4 has a counterpart through hole as a second axial oil path 18. Oil flows through these paths 19, 18 and further flows through a gap 17 between the clutch cover shaft 4 and the clutch hub 3. The oil can flow through gaps in the needle bearing 20 and further flows through an oil path 16 penetrating the clutch cover 6. The flowing oil there merges with the aforementioned oil recovery flow. To avoid oil intrusion into the multi-plate clutch 7, a sealing member 14 is repulsively fitted into a gap between the clutch cover 6 and the clutch hub 3.

To power the oil pump O/P, the power transmission device is comprised of a chain drive. The chain drive is comprised of a driving sprocket 51 coupled with the rotary shaft 5, a driven sprocket 52 drivingly coupled with a pumping shaft 57 of the oil pump O/P, and a chain 53 which couples the driving sprocket 51 with the driven sprocket 52, thereby transmitting torque in part to power the oil pump O/P.

Figure 5:
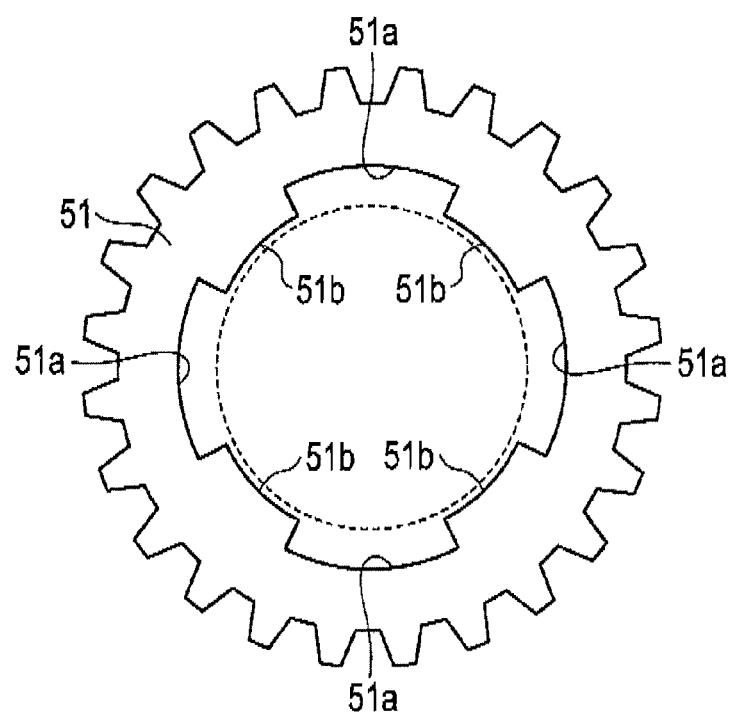
FIG. 5 is a plan view of the driving sprocket.

The driving sprocket 51 is, as shown in FIG. 5, one or more notches 51a at its inner periphery and supporting portions 51b projecting inward. The driving sprocket 51 is not supported by the rotary shaft 5 but rotatably supported by a bearing 55, details of which will be described later.

Figure 6A:
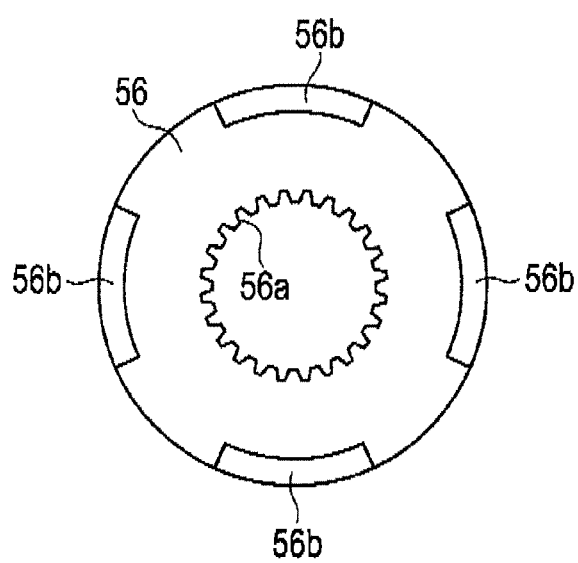
FIG. 6A is a plan view of a joint intervening between the rotary shaft and the driving sprocket and FIG. 6B shows a modified version thereof.
Figure 6B:
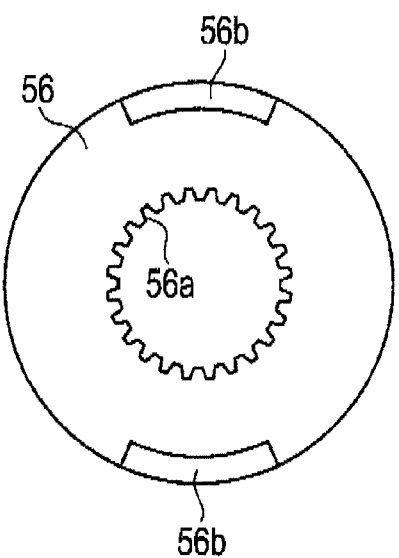

A joint 56 is provided to link the rotary shaft 5 with the driving sprocket 51. Referring to FIG. 6A, the joint 56 is preferably formed in a ring-like shape having splines 56a to mesh with the rotary shaft 5. The joint 56 at its outer edge has one or more axially projecting latches 56b for engaging with the notches 51a of the driving sprocket 51. A cross section of the joint 56 shows a C-letter shape, as clearly shown in FIG. 2, which is advantageous for avoiding interference by the bearing 55. The number of the latches 56b may be properly selected. While FIG. 6A shows an example of four latches, FIG. 6B shows another example of two latches.

The rotary shaft 5 has the splines 5a and the joint 56 has the counterpart splines 56a as described earlier, thereby mutually engaging. The driving sprocket 51 has the notches 51a and the joint 56 has the counterpart latches 56b, thereby mutually engaging. Thus the joint 56 transmits a part of torque of the rotary shaft 5 to the driving sprocket 51.

Referring again to FIG. 2, a barrel 54 is press-fitted into, thus secured to, the end plate 45 of the casing 46 (stationary member). The barrel 54 has a cylindrical hollow therein, through which the rotary shaft 5 extends with oil seals, and a collar axially projecting out of the end plate 45, which serves as the bearing 55 for rotatably supporting the driving sprocket 51. To the bearing 55, any proper bearing member such as a sliding bearing or a needle bearing may be applied, which should be interposed between the collar and the driving sprocket 51.

To axially place the driving sprocket 51 in place, a thrust plate 58 may be provided between the end plate 45 and the driving sprocket 51. To restrict the axial position of the joint 56, a stopper ring 59 is provided on the splines 5a of the rotary shaft 5. Thus the driving sprocket 51 and the joint 56 are placed within an axial width Z defined by the thrust plate 58 and the stopper ring 59.

Figure 7:
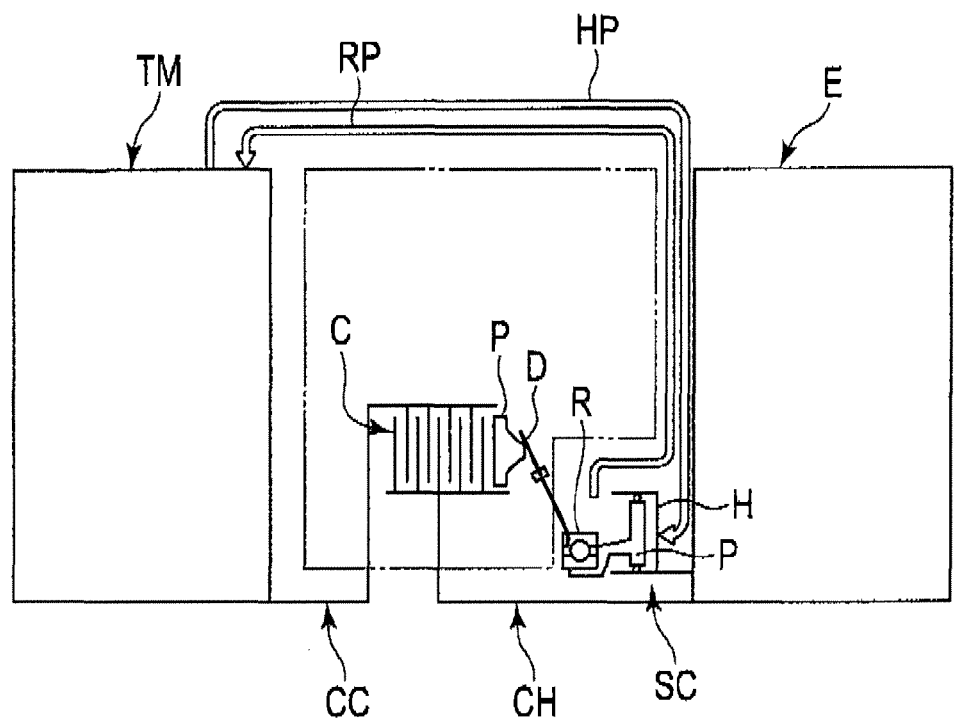
FIG. 7 is a schematic drawing showing a transmission path of torque generated by an engine or an electric motor in a case of a comparable example.

Referring to FIG. 7, if a multi-plate clutch C is operated by a pressure plate P driven by a combination of a diaphragm spring D and a slave cylinder SC with a piston P housed in a cylinder housing H, the slave cylinder SC is inevitably disposed far from a gearbox TM. Relatively long oil path HP and recovery oil path RP are required and tubing thereof is relatively difficult.

Figure 8:
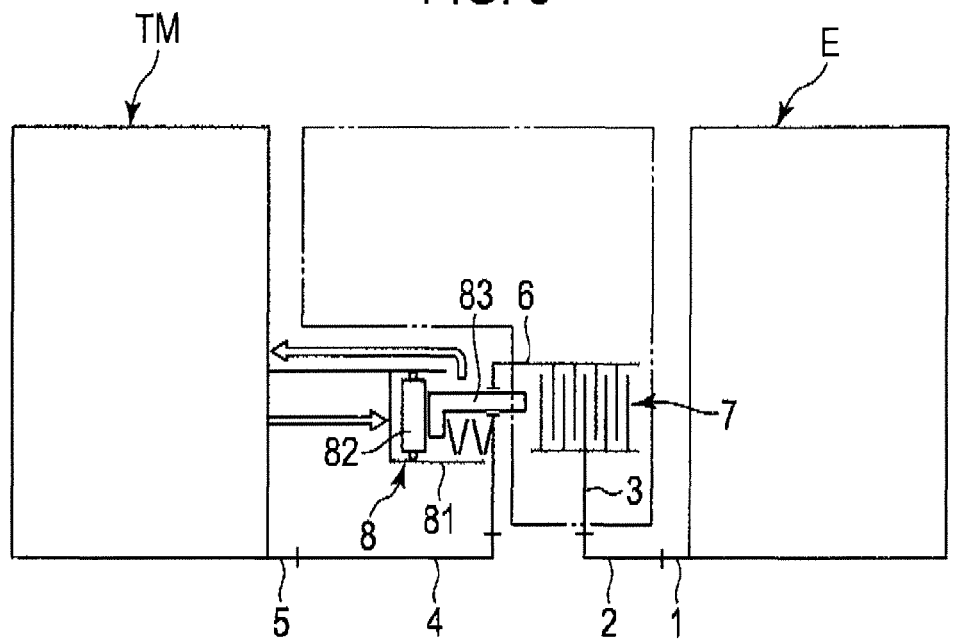
FIG. 8 is a schematic drawing showing a transmission path of torque in a case of another example.

In contrast, referring to FIG. 8 corresponding to the present embodiment, the slave cylinder 8 can be disposed close to the gearbox TM. Thus the oil paths can be shortened and simple tubing is enabled. Further, as the tubing is so simple, it is easy to provide measures for preventing oil intrusion into the motor/clutch unit M/C, thus it is easily kept dry (oil-free).

Figure 9:
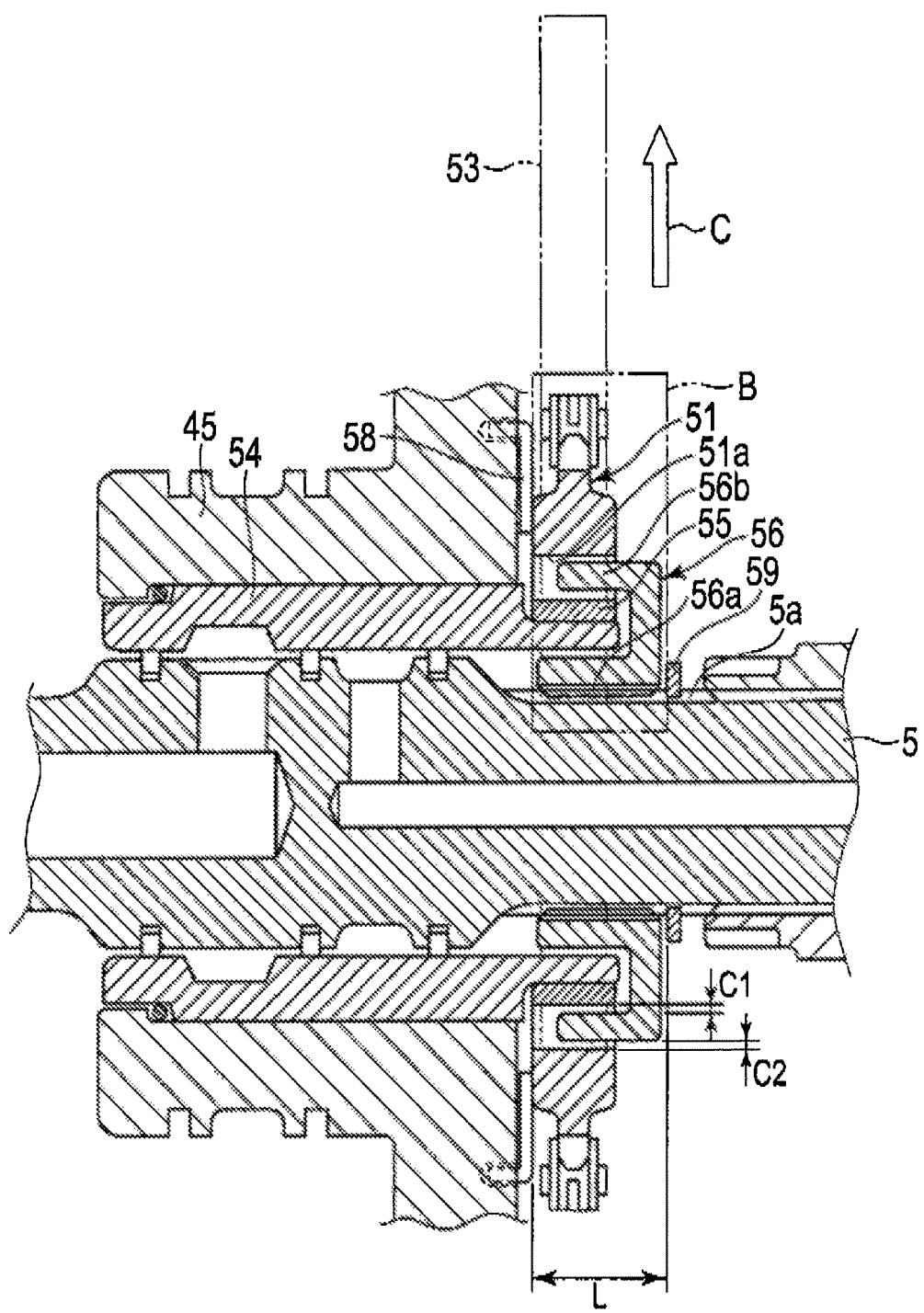
FIG. 9 is an enlarged cross sectional view of the power transmission device, particularly showing a relation among the rotary shaft, the driving sprocket and the joint.

Torque transmission and a radial load in the chain drive will be described with reference to FIG. 9. Torque transmitted from the power source acts on, and thus rotates, the rotary shaft 5. The joint 56 transmits a part of the torque to the driving sprocket 51, thereby making the chain 53 run. As the driven sprocket 52 is drivingly coupled with the pumping shaft 57 of the oil pump O/P, the transmitted part of the torque powers the oil pump O/P.

Then the running chain 53 generates a radial load C acting on the driving sprocket 51. However, the driving sprocket 51 is not supported by the rotary shaft 5 but supported by the bearing 55 secured to the stationary member. Thus the radial load C does not act on the rotary shaft 5 and accordingly misalignment of the rotary shaft 5 will not occur. Further, as the bearing 55 is no more than a short collar projecting from the barrel 54, the radial load C does not cause relatively large moment acting on the barrel 54. Thus misalignment of the driving sprocket 51 is also prevented. A relatively long lifetime will be assured.

Further the driving sprocket 51, the joint 56 and the bearing 55 are radially overlapped so as to fall within a relatively small space B having the axial width L. Thus compactness of the device can be assured and these members are exempted from overly great torsion.

Further the device allows slight deviation between the axis of the rotary axis 5 and an axis of the driving sprocket 51 because the latches of the joint 56 and the notches of the driving sprocket 51 hold small clearances C1 and C2 therebetween, which can absorb the deviation.

Figure 10:
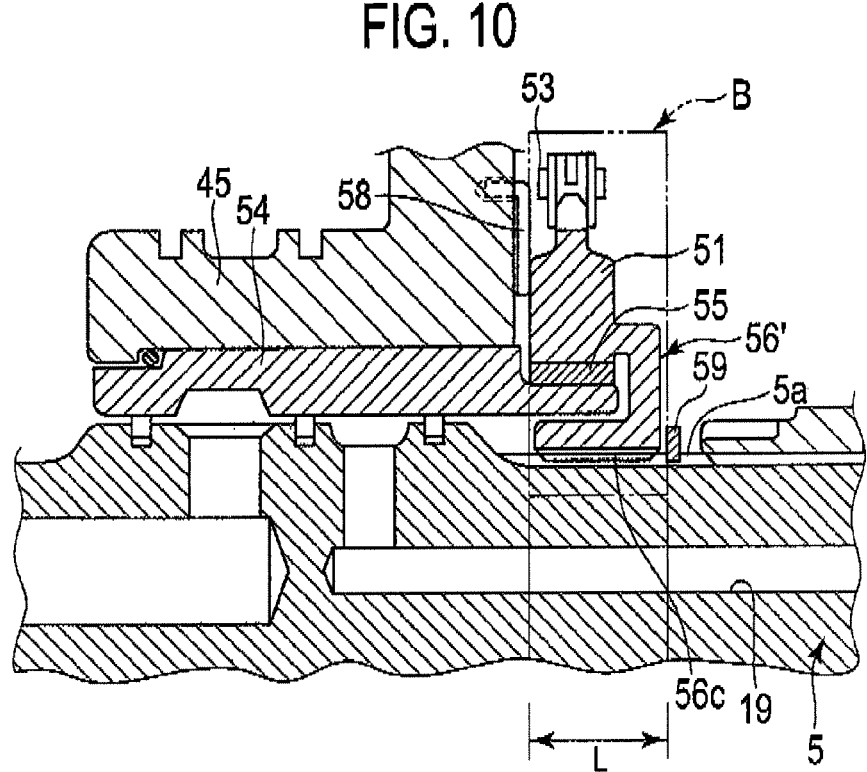
FIG. 10 is a cross sectional view of a power transmission device according to a second embodiment, particularly showing a joint, a driving sprocket and related members.

While in the aforementioned embodiment the joint 56 is a separate part from the driving sprocket 51, they may be formed in a unitary body as shown in FIG. 10.

Figure 11:
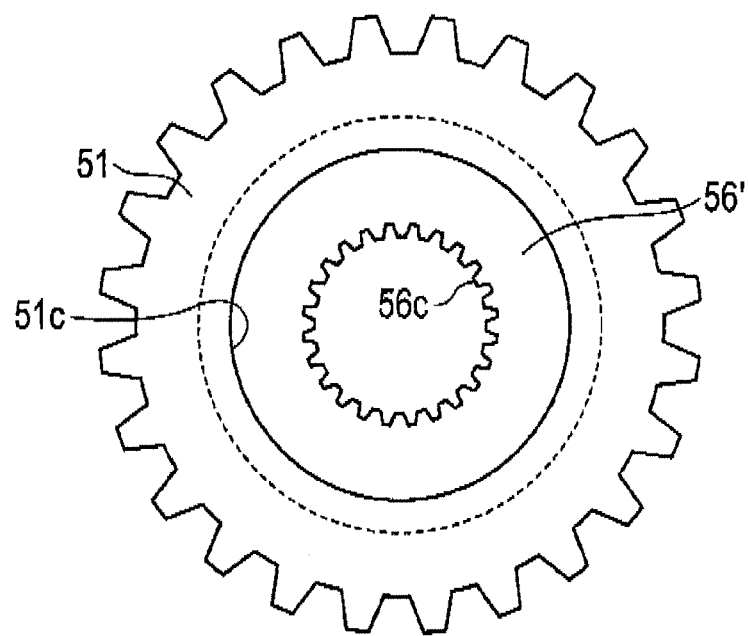
FIG. 11 is a plan view of the driving sprocket.

In this second embodiment, a joint portion 56' is formed in a unitary body with a driving sprocket 51. Referring to FIG. 11, the driving sprocket 51 may not have notches unlike the driving sprocket of the first embodiment does and therefore a supporting portion 51c can provide all-around support with respect to the bearing 55. The driving sprocket 51 by itself has splines 56c at the internal surface of the joint portion 56' for meshing with the splines 5a of the rotary shaft 5. Any of the other elements may be structured in the same way as those of the first embodiment.

As with the first embodiment, while torque of the rotary shaft 5 is distributed to the driving sprocket 51 thereby powering the oil pump O/P, the rotary shaft 5 is free from a radial load accompanying torque transmission. Moment on the barrel 54 is also kept relatively small. Therefore misalignment of both the rotary shaft 5 and the barrel 54 is effectively prevented. A relatively long lifetime will be assured. Further, as the number of members is reduced, production is made easier and its cost is reduced.

Figure 12:
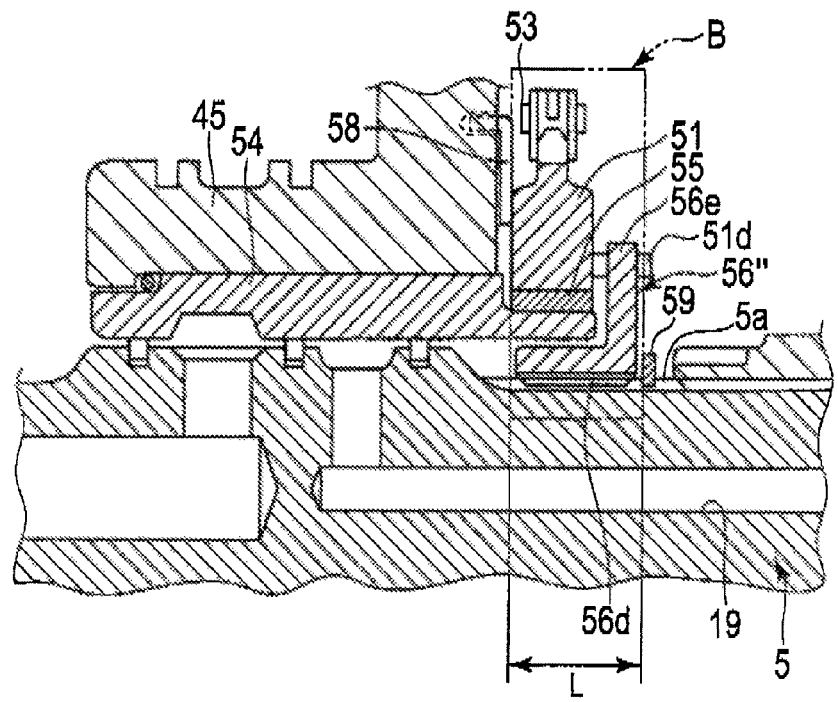
FIG. 12 is a cross sectional view of a power transmission device according to a third embodiment, particularly showing a joint, a driving sprocket and related members.
Figure 13:
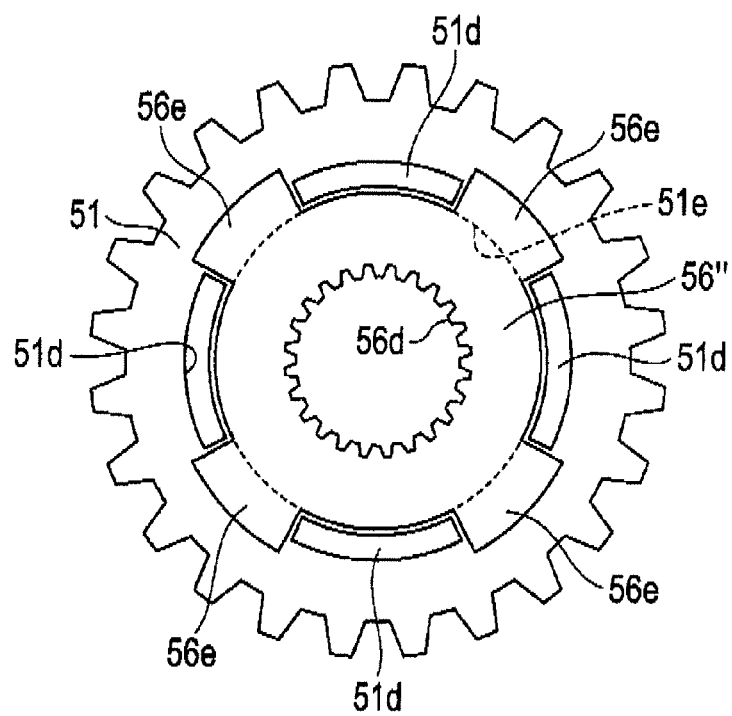
FIG. 13 is a plan view of the driving sprocket.

Further the first sprocket 51 and the joint 56 may be modified in a way as shown in FIGS. 12 and 13. In this third embodiment, a joint 56" is comprised of a ring-like body with internal splines 56d and radially projecting latches 56e. A driving sprocket 51 is comprised of one or more counterpart projections 51d projecting in the axial direction for meshing with the projecting latches 56e. Thereby the joint 56" transmits torque from the rotary shaft 5 to the driving sprocket 51. As the combination of the axially projecting projections 51d and the latches 56e successfully detour the bearing as clearly shown in FIG. 12, this combination is advantageous for avoiding interference by the bearing 55.

The third embodiment provides the same effect as those of the first embodiment while the joint 56" is more simply structured than the joint 56 and the joint 56' of the first and second embodiments do.

This application claims priority from Japanese Patent Application No, 2010-116258 filed on May 20, 2010; the entire contents of which are incorporated herein by reference.

Although the invention has been described above by reference to certain exemplary embodiments of the invention, the invention is not limited to the exemplary embodiments described above. Modifications and variations of the embodiments described above will occur to those skilled in the art, in light of the above teachings.

What is claimed is:

1. A power transmission device for distributing torque from a power source to an external device and an auxiliary device, comprising:
   a first bearing and a second bearing both secured to a stationary member;
   a first sprocket rotatably supported by the first bearing;
   a second sprocket configured to be drivingly coupled with the auxiliary device;

a chain coupling the first sprocket with the second sprocket;

a rotary shaft rotatably supported by the second bearing, the rotary shaft being drivingly coupled with the power source and drivingly engageable with the external device to transmit a first part of the torque to the external device;

a joint drivingly linking the rotary shaft with the first sprocket to transmit a second part of the torque to the first sprocket; and a coupling between the rotary shaft and the joint, the coupling fixing the rotary shaft and the joint such that there is no relative rotation between the rotary shaft and the joint, wherein the first sprocket, the joint, the first bearing and the coupling are radially overlapped, wherein the first sprocket includes a notch configured to engage with the joint, and the joint includes a latch engageable with the notch such that the notch and the latch maintain a clearance in a radial direction of the rotary shaft.

2. The power transmission device of claim 1, further comprising:

a barrel fitted into the stationary member, the barrel including a collar projecting out of the stationary member, and a cylindrical hollow, the rotary shaft extending through the cylindrical hollow, wherein the collar is configured as the first bearing.

3. The power transmission device of claim 1, wherein:

the rotary shaft includes a spline configured to engage with the joint, and the joint includes a counterpart spline engageable with the spline of the rotary shaft.

4. The power transmission device of claim 1, wherein the coupling comprises a spline coupling.

5. The power transmission device of claim 1, wherein the joint comprises internal splines.

6. The power transmission device of claim 1, wherein the first sprocket and the joint are disposed within an axial width defined by a thrust plate and a stopper ring.

7. The power transmission device of claim 1, wherein the first sprocket and a joint portion form a unitary body.

8. A power transmission device for distributing torque from a power source to an external device and an auxiliary device, comprising:

a first bearing secured to a first stationary member;

a second bearing secured to a second stationary member;

a first sprocket rotatably supported by the first bearing;

a second sprocket configured to be drivingly coupled with the auxiliary device;

a chain coupling the first sprocket with the second sprocket;

a rotary shaft rotatably supported by the second bearing, the rotary shaft being drivingly coupled with the power source and drivingly engageable with the external device to transmit a first part of the torque to the external device;

a joint drivingly linking the rotary shaft with the first sprocket to transmit a second part of the torque to the first sprocket; and a coupling between the rotary shaft and the joint that mutually engages the rotary shaft and the joint such that torque transmitted from the power source to the first sprocket via the coupling causes the chain to run, wherein the first sprocket, the joint, the first bearing and the coupling are radially overlapped, wherein the first sprocket includes a notch configured to engage with the joint, and the joint includes a latch engageable with the notch such that the notch and the latch maintain a clearance in a radial direction of the rotary shaft.

9. The power transmission device of claim 8, wherein the coupling comprises a spline coupling.

10. The power transmission device of claim 8, wherein the joint comprises internal splines.

11. The power transmission device of claim 8, wherein the first sprocket and the joint are disposed within an axial width defined by a thrust plate and a stopper ring.

12. The power transmission device of claim 8, wherein the first sprocket and a joint portion form a unitary body.

* * * * *